United States Patent
Grant et al.

(10) Patent No.: US 12,383,848 B2
(45) Date of Patent: Aug. 12, 2025

(54) CHROMATOGRAPHIC METHOD FOR SEPARATING TRANSITION METALS

(71) Applicant: JOHNSON MATTHEY PUBLIC LIMITED COMPANY, London (GB)

(72) Inventors: Richard Alasdair Grant, Reading (GB); Paul Noel O'Shaughnessy, Reading (GB)

(73) Assignee: Johnson Matthey Public Limited Company, London (GB)

( * ) Notice: Subject to any disclaimer, the term of this patent is extended or adjusted under 35 U.S.C. 154(b) by 574 days.

(21) Appl. No.: 17/758,779

(22) PCT Filed: Feb. 11, 2021

(86) PCT No.: PCT/GB2021/050333
§ 371 (c)(1),
(2) Date: Jul. 13, 2022

(87) PCT Pub. No.: WO2021/186143
PCT Pub. Date: Sep. 23, 2021

(65) Prior Publication Data
US 2023/0046406 A1   Feb. 16, 2023

(30) Foreign Application Priority Data

Mar. 17, 2020   (GB) ..................... 2003835

(51) Int. Cl.
*B01D 15/16* (2006.01)
*C22B 3/00* (2006.01)
(Continued)

(52) U.S. Cl.
CPC .............. *B01D 15/168* (2013.01); *C22B 3/24* (2013.01); *C22B 11/046* (2013.01); *C22B 23/04* (2013.01); *C22B 47/00* (2013.01)

(58) Field of Classification Search
CPC .. B01D 15/168; B01D 15/206; B01D 15/166; B01D 15/10; B01D 15/16; C22B 3/24;
(Continued)

(56) References Cited

U.S. PATENT DOCUMENTS 5,879,644 A * 3/1999 Grant .................... C22B 3/24
423/22
2010/0224029 A1 * 9/2010 Niisawa .................. C22B 3/10
75/711

FOREIGN PATENT DOCUMENTS

| EP | 1 167 555 A1 | 1/2002 |
| WO | 03/093515 A1 | 11/2003 |
| WO | 2016/011396 A1 | 1/2016 |

OTHER PUBLICATIONS

Li, et al., "Cation separation and preconcentration using columns containing cyclen and cyclen-resorcinarene derivatives", Journal of Chromatography A, vol. 1245, pp. 83-89, 2012.
(Continued)

*Primary Examiner* — Danielle M. Carda
(74) *Attorney, Agent, or Firm* — BakerHostetler (57) ABSTRACT

A method for separating of at least two transition metals, the method comprising: injecting a feed solution into a chromatography column comprising a chromatographic support media, the feed solution comprising at least two transition metals; eluting the feed from the column in an elution cycle by flowing an eluent through the column, wherein a concentration of the eluent is reduced during the elution cycle prior to elution of at least one of the transition metals.

12 Claims, 7 Drawing Sheets

(51) Int. Cl.
  *C22B 3/24* (2006.01)
  *C22B 11/00* (2006.01)
  *C22B 47/00* (2006.01)
(58) Field of Classification Search
  CPC ....... C22B 11/046; C22B 23/04; C22B 47/00;
        C22B 11/04; C22B 23/00; C22B 26/12
  USPC .......................................................... 75/711
  See application file for complete search history.

(56) References Cited

OTHER PUBLICATIONS

Lu, et al., "Use of ion chromatography for the determination of heavy and transition metals in biochemical samples", Journal of Chromatography A, vol. 857, Issues 1-2, 1, pp. 343-349, 1999.
Barron, et al., "Separation of transition metals on a poly-iminodiacetic acid grafted polymeric resin column with post-column reaction detection utilising a paired emitter-detector diode system", Journal of Chromatography A, vol. 1213, No. 1, pp. 31-36, 2008.
Sanchez, et al., "Separation of some platinum group metal chelates with 8-hydroxyquinoline by various high-performance liquid chromatographic methods", Journal of Chromatography A, vol. 871(1-2), pp. 217-226, 2000.

* cited by examiner

CHROMATOGRAPHIC METHOD FOR SEPARATING TRANSITION METALS

FIELD

The present specification relates to chromatographic methods for the separation of transition metals contained in feed solutions. Examples include chromatographic methods for the separation of platinum group metals (PGMs) from each other and from associated base metal (BM) and/or amphoteric elements and/or gold (Au) contained in PGM feed solutions. Further examples include chromatographic methods for the separation of base metals such as nickel, cobalt, manganese, copper and iron, e.g. in battery materials recycling processes. Further still the methods may be applied to other high value transition metals such as rhenium and technetium.

BACKGROUND

The chromatographic separation of transition metals, such as PGM elements, is known in the art. In such methods, a chromatographic column can be prepared by packing with a suitable chromatographic support media. A number of different types of media are known in the art. Examples include methacrylate polymers. Once prepared, a transition metal (e.g. PGM) containing feed solution is injected into the chromatography column comprising the chromatographic support media. Typically, PGM feed solutions can comprise at least two platinum group metals and at least one base metal and/or amphoteric element and/or Au. The feed is then eluted from the column in an elution cycle by flowing an eluent through the column. Examples of suitable eluents include concentrated solutions of halide salts or acids, e.g. HCl, NaCl, or LiCl. One option is to use concentrated HCl at concentrations in a range of around 5.5 M to 6.5 M. Different species have different retention times in the column, and thus multi-component separation can be achieved with products collected sequentially with high purity.

This technique can be applied to a variety of PGM and base metal mixtures and can achieve a number of different separation variants depending on the feed solution composition, chromatographic support media, and eluent. One important example is the separation of palladium and platinum from each other and from insoluble metals (IMs, e.g. Rh, Ir and Ru). This is typically performed on feeds that have been dissolved in a chloride matrix and after removal of gold, iron and other later eluting impurities.

It is an aim of the present invention to provide an improved chromatographic method for the separation of transition metals contained in feed solutions, e.g. platinum group metals from each other and from associated base metal and/or amphoteric elements and/or Au contained in PGM feed solutions.

SUMMARY OF INVENTION

One problem with the prior art methods is that the time to elute all the transition metal (e.g. PGM) species from the column can be long, resulting in long elution cycle times.

Another problem with the prior art methods is that certain transition metal (e.g. PGM) species elute over a broad time band which increases the volume of eluent required to collect these species. This results in a very dilute transition metal (e.g. PGM) product solution. Bands are typically characterised by so called "shock fronts" of high concentration followed by long peak "tails" or dispersive fronts. These are determined from the shape of the Langmuir type isotherm which is the governing factor for peak shape in overloaded/non-linear chromatography.

The aforementioned characteristics lead to low concentration products and increased cycle times, which reduces the productivity of the process. This has the effect of limiting the economic viability of any scaled-up industrial process using this methodology.

The present specification describes an improved method for separating transition metals. The method comprises:

injecting a feed solution into a chromatography column comprising a chromatographic support media, the feed solution comprising at least two transition metals;

eluting the feed from the column in an elution cycle by flowing an eluent through the column, wherein a concentration of the eluent is reduced during the elution cycle prior to elution of at least one of the transition metals.

The transition metals to be separated can be selected from the group consisting of platinum group metals, gold, nickel, cobalt, manganese, copper, iron, rhenium, and technetium. Applications include recycling of high value transition metals such as PGMs, gold, rhenium, and technetium. Further applications include recycling of transition metals used in electronic applications such as nickel, cobalt, manganese, copper, and/or iron, e.g. in battery recycling.

For PGM applications, the present specification describes an improved method for separating platinum group metals from each other and from at least one base metal and/or at least one amphoteric element and/or Au. The method comprises:

injecting a feed solution into a chromatography column comprising a chromatographic support media, the feed solution comprising at least two platinum group metals and at least one base metal and/or amphoteric element and/or Au;

eluting the feed from the column in an elution cycle by flowing an eluent through the column, wherein a concentration of the eluent is reduced during the elution cycle prior to elution of at least one of the platinum group metals.

Starting the elution using a standard, high concentration eluent (e.g. 6 M HCl) enables base metals and insoluble metals (IMs, e.g. Ru, Ir, Ru) to be eluted quickly from the column. Subsequently reducing the concentration of eluent (e.g. to 0.1M HCl) has been found to speed up the elution of later eluting components and also to narrow the elution bands. As such, the time required for the elution cycle is reduced and the concentration of product solutions is increased reducing evaporation requirements. It has also been found that the method reduces the diameter of the required column and enables a wider range of PGM separations to be practically achieved while significantly improving the scale-up economics of such processes.

While gradient chromatography methods have been used in other fields of technology such as pharmaceutical applications, the present inventors are not aware of this problem having been identified before in the field of PGM separation and purification or any indication that such chromatography techniques would be useful in improving such techniques.

In relation to the above, it has been found that it is not straight forward to apply a gradient chromatography technique to PGM separation methods. This is because very concentrated halide eluents are used in such processes (e.g. 6 M HCl). Significantly reducing the concentration of the eluent (e.g. to <1 M HCl) during the elution cycle has been found to de-stabilize the chromatography support media. Typical polymer chromatographic support medias used in PGM separation techniques contract in volume as the concentration of eluent is reduced and this adversely effects retention times and separation of PGM components. This is not a problem using standard PGM separation techniques in which the eluent is maintained at a single concentration during elution (i.e. isocratic). However, it is a barrier to the application of gradient chromatography in PGM separation techniques.

To enable the present PGM separation technique using gradient chromatography, the present specification also describes a method of preparing a chromatography column for use in such methods. The column preparation method comprises:

i) suspending a polymeric chromatography support media in a solution in which the polymeric chromatographic support media is in a contracted state;

ii) packing the polymeric chromatography support media into a column while the polymeric chromatographic support media is in its contracted state;

iii) adjusting the column while the polymeric chromatographic support media is in its contracted state to restrict the polymeric chromatography support media from moving along the column; and iv) flowing a solution in which the polymeric chromatographic support media expands, through the polymeric chromatography support media in the column, whereby the polymeric chromatographic support media is subjected to compression within the column as it expands and is restricted from moving along the column. Optionally, a number of contraction and expansion steps can be performed to condition the column by switching between high and low concentration solutions (e.g. switching between 6M HCl and 0.1 M HCl).

This column preparation method ensures even, stable packing of the chromatography support media. The method reduces or prevents shrinking and swelling of the chromatography support media in subsequent use for PGM separation when the eluent concentration is changed and allows a gradient separation scheme to be applied in PGM separation methods.

The methods as summarized above can be implemented in a variety of different ways as set out in the detailed description.

BRIEF DESCRIPTION OF THE DRAWINGS

For a better understanding of the present invention and to show how the same may be carried into effect, certain embodiments of the present invention will now be described by way of example only with reference to the accompanying drawings, in which.

DETAILED DESCRIPTION

As described in the summary section, the present specification describes an improved method for separating transition metals. The method comprises:

injecting a feed solution into a chromatography column comprising a chromatographic support media, the feed solution comprising at least two transition metals;

eluting the feed from the column in an elution cycle by flowing an eluent through the column, wherein a concentration of the eluent is reduced during the elution cycle prior to elution of at least one of the transition metals.

Figure 1:
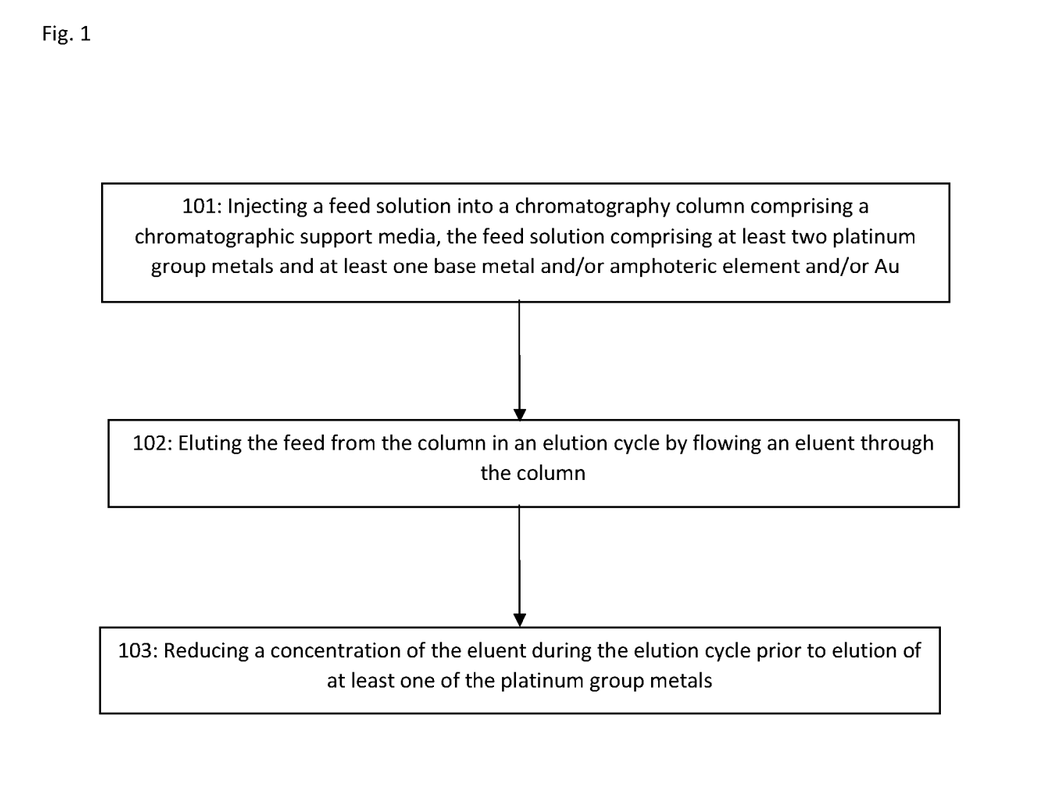
FIG. 1 shows a flow diagram of a chromatographic method for the separation of platinum group metals.
Figure 2:
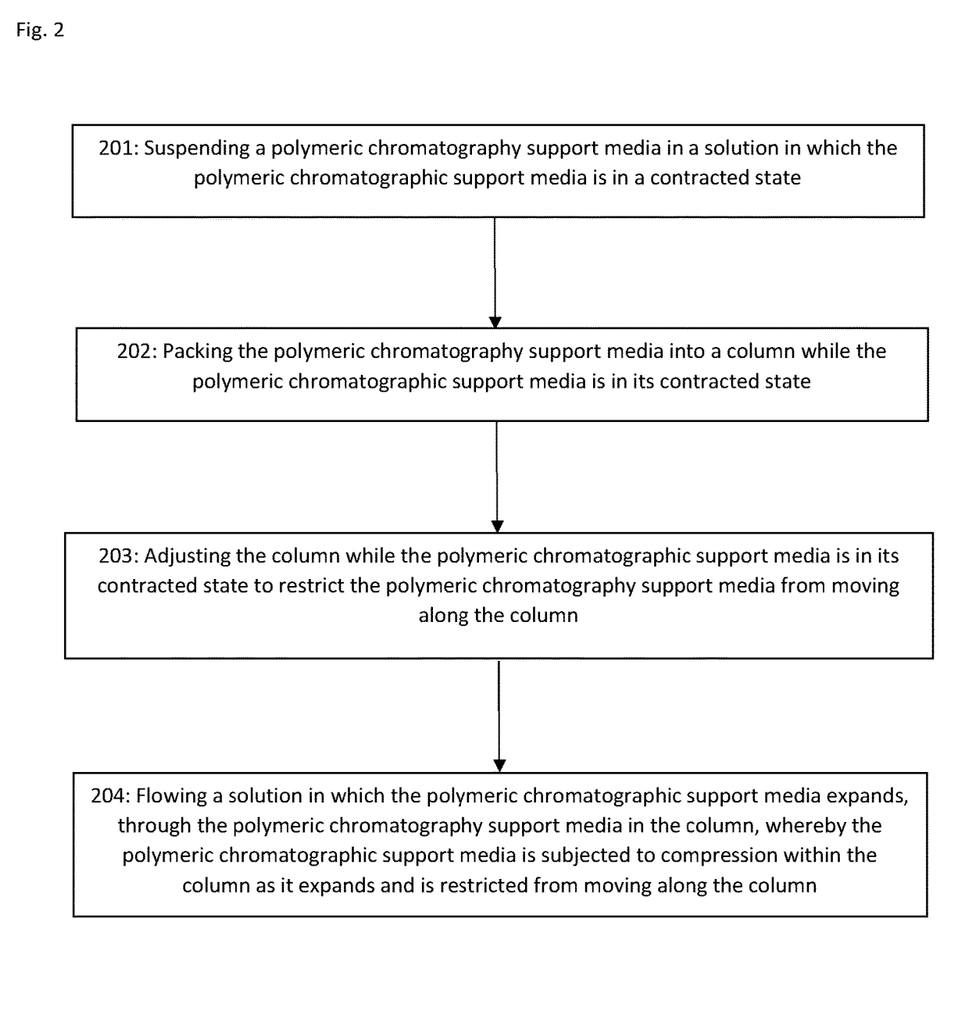
FIG. 2 shows a flow diagram of a method for preparing a chromatography column for use in the separation of platinum group metals.

Examples include an improved chromatographic method for the separation of platinum group metals from each other and from associated base metal and/or amphoteric elements and/or Au contained in PGM feed solutions. The method is illustrated in FIG. 1 and comprises the following steps:

101—injecting a feed solution into a chromatography column comprising a chromatographic support media, the feed solution comprising at least two platinum group metals and at least one base metal and/or amphoteric element and/or Au;

102—eluting the feed from the column in an elution cycle by flowing an eluent through the column, 103—reducing a concentration of the eluent during the elution cycle prior to elution of at least one of the platinum group metals.

Starting the elution using a standard, high concentration eluent (e.g. 6 M HCl) enables base metals (note Fe typically elutes after Pt) and insoluble metals (IMs, e.g. Ru, Ir, Ru in a 3+ oxidation state) to be eluted quickly from the column. Reducing the concentration of eluent to <3 M results in Fe and Te eluting with the other bases metals. Subsequently reducing the concentration of eluent (e.g. to 0.1M HCl) has been found to speed up the elution of later eluting components and also to narrow the elution bands. As such, the time required for the elution cycle is reduced and the concentration of product solutions is increased reducing evaporation requirements. It has also been found that the method reduces the diameter of the required column for a given throughput and enables a wider range of PGM separations to be practically achieved while significantly improving the scale-up economics of such processes.

The eluent can be a halide salt or an acid halide such as HCl, NaCl, or LiCl. The concentration of eluent can be reduced gradually (linear or nonlinear gradient curve) or, more preferably, in a step-wise fashion from a higher concentration of eluent to a lower concentration of eluent. The elution cycle may comprise a single step-wise reduction in the eluent concentration or may comprise two or more step-wise reductions in the eluent concentration. The number, concentration reduction, and timing of the reductions will be dependent on the specific PGM feed composition and desired separation. The elution protocol can be optimized to concentrate later eluting components and shorten overall elution cycle times while maintaining a clear separation of components. Furthermore, the concentration of the eluent can be increased prior to the end of the elution cycle allowing a column regeneration period to bring the column back to a higher eluent concentration before the next feed injection. Typically, the concentration of eluent can be cycled between a higher concentration of at least 5 M (e.g. in a range 5 M to 7 M or 5.5 M to 6.5 M) and a lower concentration of no more than 1 M (e.g. in a range 0.001 M to 1 M).

The gradient chromatography method as described herein can be applied in a number of ways with a variety of PGM and base metal separation methods.

In one example, the feed comprises platinum and one or more of base metal, Rh, Ir, and Ru (with the Rh, Ir, Ru in a 3+ oxidation state). The concentration of the eluent is reduced after elution of the base metal, Rh, Ir, and Ru and prior to elution of the platinum (in a 4+ oxidation state) from the column. The insoluble metal elements Ru and Ir can be reduced to their 3+ oxidation state in a redox potential range of 500 to 550 mV prior to the gradient chromatography method. The feed may comprise both Pd and Pt or only Pt for feeds in which the Pd is absent or has been previously removed. When the feed comprises both Pd and Pt, the concentration of the eluent is reduced after elution of the base metal, Rh, Ir, and/or Ru and prior to or during the elution of the palladium. For example, the concentration of eluent may be reduced prior to the peak of the Pd elution band. The Pd and Pt can be eluted separately or together.

Gold, iron, and any other later eluting impurities may be removed from the feed prior to application of the gradient chromatography method. However, this is not necessary using the presently described methodology which can be applied to feeds containing late eluting impurities such as Au, Fe, and/or Os. This is a key limitation of prior isocratic PGM chromatography methods which require the removal of these species from the feed prior to application of the chromatography method. The present gradient chromatography method does not require the removal of these species from the feed prior to application of the gradient chromatography method. As such, the present method enables feeds with these elements to be treated and thus expands the number and type of PGM feeds which can be processed via chromatography.

The feed can initially be injected as normal in 5.5 M to 6.5 M HCl and after the insoluble metals and base metal have eluted the eluent is switched to a low concentration acid (e.g. less than 1 M and more preferably less than 0.1 M HCl) for elution of the Pt (and Pd if present). The column can then be re-equilibrated with 5.5 M to 6.5 M HCl prior to the next feed injection.

According to another example, the feed comprises Rh and Ir in a 3+ oxidation state and RuNO, and the concentration of the eluent is reduced after elution of the Rh and Ir, and prior to elution of the RuNO from the column. In this example, the Ru is converted to a nitrosyl complex prior to chromatographic separation. The feed may also comprise base metal in which case the concentration of the eluent is reduced after elution of the base metal, Rh and Ir, and prior to elution of the RuNO from the column. The feed may also comprise Pt which is eluted after the RuNO.

According to another example, the feed comprises base metal, Rh in a 3+ oxidation state, Ir in a 4+ oxidation state, and Ru in the form of RuNO, and wherein the concentration of the eluent is reduced prior to elution of the Ir from the column. An oxidant can be added to prevent reduction of the Ir from a 4+ oxidation state to a 3+ oxidation state during elution.

According to yet another example, the feed comprises base metal, osmium one or more of Rh, Ir, and Ru in a 3+ oxidation state, palladium, platinum, and one or more of Fe, Te, Cu, Sn, Os, and Au. The concentration of the eluent is reduced after elution of the base metal, Rh, Ir, and Ru and prior to elution of the Fe, Te, Cu, Sn, Os, and/or Au. The concentration of eluent is then further reduced after elution of the palladium and platinum and prior to elution of the Fe, Te, Cu, Sn, Os, and/or Au. In this case the order of elusion of species switches with Fe and Te eluting with Cu and Sn/Os and then Au.

According to yet another example, the feed comprises base metal, PGMs including osmium, at least one amphoteric element, and gold. In this example, the feed is initially loaded in 6M HCl and eluted in the 6M HCl until Pt is removed. The concentration of eluent is then reduce to 0.1 M HCl to elute Fe/Te/Sn/Os then the concentration of eluent is further reduce to water to remove Au.

The gradient chromatography method enables the possibility for separation of Os and Au in a single chromatography step. This negates the requirement for separate Os and Au removal stages as in conventional refining processes. As such, this provides a wider flowsheet benefit and enables PGM process intensification.

The methods as described above can be applied to a variety of polymer supported chromatography media/solid phase used for PGM separation. Examples include XAD7, HW, hydrophilised PS-DVB supports (e.g. ABEC5000), methacrylate or thioether functionalised methacrylate (e.g. the Macroprep range of methacrylate polymers). Suppliers include Dow, Tosoh, and BioRad. However, one problem with this method is that significantly reducing the concentration of the eluent (e.g. from 6M HCl to less than 1 M HCl) during the elution cycle has been found to de-stabilize the chromatography support media. Typical polymer chromatographic support medias used in PGM separation techniques contract in volume as the concentration of eluent is reduced and this can adversely affect retention times and separation of PGM components. To enable the present PGM separation technique using gradient chromatography, a method of preparing a chromatography column for use in such methods has been developed. The column preparation method comprises:

suspending a polymeric chromatography support media in a solution in which the polymeric chromatographic support media is in a contracted state;

packing the polymeric chromatography support media into a column while the polymeric chromatographic support media is in its contracted state;

optionally, flowing a solution in which the polymeric chromatographic support media is in its contracted state through the polymeric chromatography support media in the column at a flow rate which provides a pressure drop across the polymeric chromatography support media whereby the polymeric chromatography support media is under compression;

adjusting the column while the polymeric chromatographic support media is in its contracted state to restrict the polymeric chromatography support media from moving along the column—adjustment of the column may comprise contacting the polymeric chromatographic support media in the column with an inlet frit and locking the inlet frit in place to restrict the polymeric chromatography support media from moving along the column when subjected to a solution which causes expansion of the polymeric chromatographic support media; and flowing a solution in which the polymeric chromatographic support media expands, through the polymeric chromatography support media in the column, whereby the polymeric chromatographic support media is subjected to compression within the column as it expands and is restricted from moving along the column.

Optionally, a number of contraction and expansion steps can be performed to condition the column by switching between high and low concentration solutions (e.g. switching between 6M HCl and 0.1 M HCl). As such, the method may further comprise the following steps which can be repeated:

flowing a solution in which the polymeric chromatographic support media contracts through the polymeric chromatography support media in the column; followed by flowing a solution in which the polymeric chromatographic support media expands through the polymeric chromatography support media in the column.

This column preparation method ensures even, stable packing of the chromatography support media. The method reduces or prevents shrinking and swelling of the chromatography support media in subsequent use for PGM separation when the eluent concentration is changed and allows a gradient separation scheme to be applied in PGM separation methods.

The polymeric chromatographic support media may comprise one or more of a methacrylate, a glycol, a hydrophilic PS-DVB support, and a co-polymer. For example, the polymeric chromatographic support media can be a cross linked co-polymer of glycol methacrylate and ethylene glycol dimethacrylate. Alternatively, the polymeric chromatographic support media can be a co-polymer of oligo ethylene glycol, glycidyl methacrylate and ethylene glycol di-methacrylate. Yet another possibility is that the polymeric chromatographic support media is a polystyrene divinyl benzene polymer with hydrophilic oligo glycols groups covalently attached.

The solutions used for contracting and expanding the polymeric chromatographic support media can be the same type of solutions used in the PGM separation method. For example, the solutions used for contracting and expanding the polymeric chromatographic support media may comprise a halide salt or an acid halide, the solutions having different concentrations for contracting and expanding the polymeric chromatographic support media. Where the solutions are HCl, increasing the concentration of the HCl causes the polymeric chromatographic support media to expand, and decreasing the concentration of the HCl causes the polymeric chromatographic support media to contract. The HCl can be provided at a concentration of at least 5 M to expand the polymeric chromatographic support media and at a concentration of no more than 1 M to contract the polymeric chromatographic support media.

The above described methodology has been found to be suitable to stabilize the packing of support media in the form of particles or beads when applying a gradient chromatography method to PGM feeds where the gradient chromatography method involves large changes in eluent concentration. An alternative method of providing a chromatographic support media which is stable to large concentration changes during a transition metal (e.g. PGM) gradient chromatography separation is to use a monolithic and/or 3D-printed chromatography support media.

It will be evident from the above that the gradient chromatograph methods described herein provide a significant improvement over isocratic methods for a range of chromatography support media and for a range of PGM feed compositions. For example, when using a thioether functionalised methacrylate support media and a PGM feed comprising insoluble metal, platinum, and palladium, elution of species is significantly improved by applying a gradient chromatography method. The gradient chromatography method also can extend the scope of chromatography media which can be used for a particular PGM feed composition.

EXAMPLES

1. Gradient Elution with Insoluble Metal (IM), Pd, and Pt Separation

Media Details

Toyopearl HW40C (previously known as Fractogel) is a hydrophilic methacrylate polymer manufactured by TOSOH Bioscience (previously known as Tosoh Haas). It has an average pore diameter of 40 A and the C grade is the course particle size grade in the range 50-100 A. This is porous bead produced by the suspension polymerisation of glycidyl methacrylate, oligo ethylene glycol and pentaerythritol dimethacrylate.

Feed Details

A test feed solution was prepared containing 16 g L$^{-1}$ Cu from copper(II) chloride, 9 g L$^{-1}$ Ir(III) from Na$_2$[IrCl$_6$]$^{2-}$, 49 g L$^{-1}$ Pd from Na$_2$[PdCl$_4$]$^{2-}$, 65 g L$^{-1}$ Pt(IV) from chloroplatinic acid (CPA), 36 g L$^{-1}$ Rh(III) as RhCl$_3$ and 7.4 g L$^{-1}$ Ru(III) as Na$_3$[RuCl$_6$]$^{2-}$.

Experimental Details

Fines and the 20% ethanol/water solution that the HW40C media is supplied with were first removed by 3×slurry-decant cycles with 0.1 M HCl. The gel was then re-suspended in 0.1 M HCl and packed into the 10 mm diameter column to a bed height of 30 cm. The column was then conditioned for operating in gradient elution operation by a series of elutions with 0.1 M and 6 M HCl according to the sequence in the table.

|  | Eluent (M) | Flow rate (ml/min) | Pressure (MPa) | Time (min) |
| --- | --- | --- | --- | --- |
| Step 1 | 0.1 | 5 | 0.2 | 2 |
| Step 2 | 0.1 | 3 | 0.1 | 20 |
| Step 3 | 6 | 3 | 0 | 20 |
| Step 4 | 0.1 | 2.3 | 0 | 15 |
| Step 5 | 6 | 2.3 | 0 | 15 |

This sequence provides a pressure packing and an axial compression methodology to the packing procedure for HW40C in step gradient operation. In the first instance the media is packed in its least swollen state. The flow rate is then adjusted to 5 ml/min to provide 0.2 MPa pressure drop across the bed to ensure axial compression (Step 1). The column head piece and inlet frit were then adjusted to meet the top of the packed bed before executing the rest of the sequence. A high performance liquid chromatography (HPLC) pump was employed for the experiment in order to control pressure on the column. The locked head piece provides static axial compression.

A 1 ml volume of the mixed PGM feed was then injected and eluted according to the sequence below with a step acid concentration change during the cycle of 6 to 0.1 M after 16 minutes. The flow rate was maintained at 2.3 mL min$^{-1}$ during the experiment.

|  | Eluent | Time (min) |
| --- | --- | --- |
| Step 1 | Feed Injection | 0.4 |
| Step 2 | 6M HCl | 16 |
| Step 3 | 0.1M HCl | 28 |
| Step 4 | 6M HCl | 16 |

Figure 3:
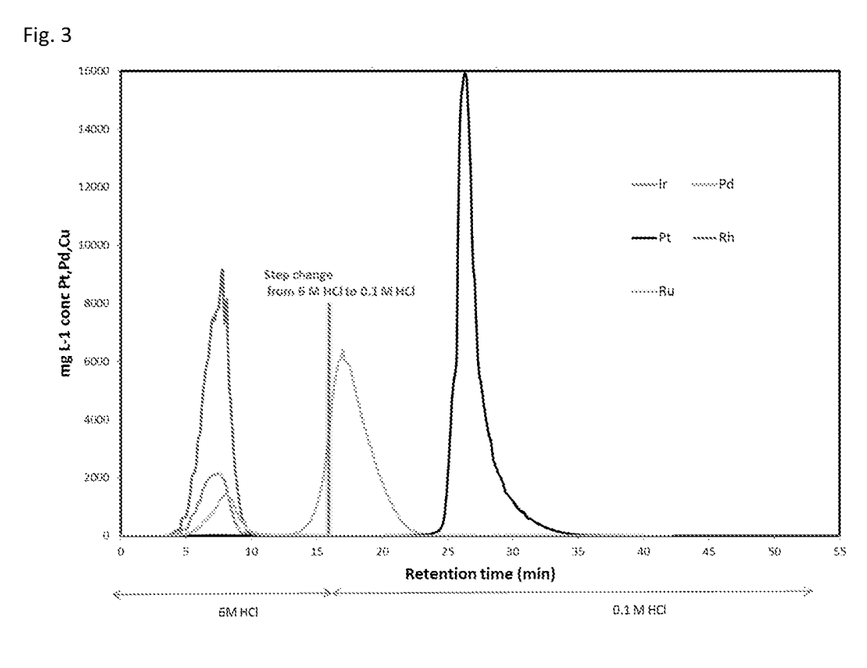
FIG. 3 shows a chromatogram illustrating separation of insoluble metals and Cu from Pd and Pt including a 6 M HCl elution phase and a 0.1 M HCl elution phase—the chromatogram exhibits a more concentrated Pt band compared to isocratic elution and a shorter elution cycle time while maintaining a clear separation between the Pd and Pt.

The chromatogram obtained (FIG. 3) shows clear separation of the insoluble metals and Cu from Pd during the 6 M HCl elution phase. The 0.1 M HCl elution exhibits a more concentrated Pt band compared to isocratic elution and a shorter elution time resulting in an improved overall cycle time. Clear separation between the Pd and Pt is maintained.

2. Isocratic Elution with Insoluble Metal (IM), Pd, and Pt Separation (Comparative Example)

Figure 4:
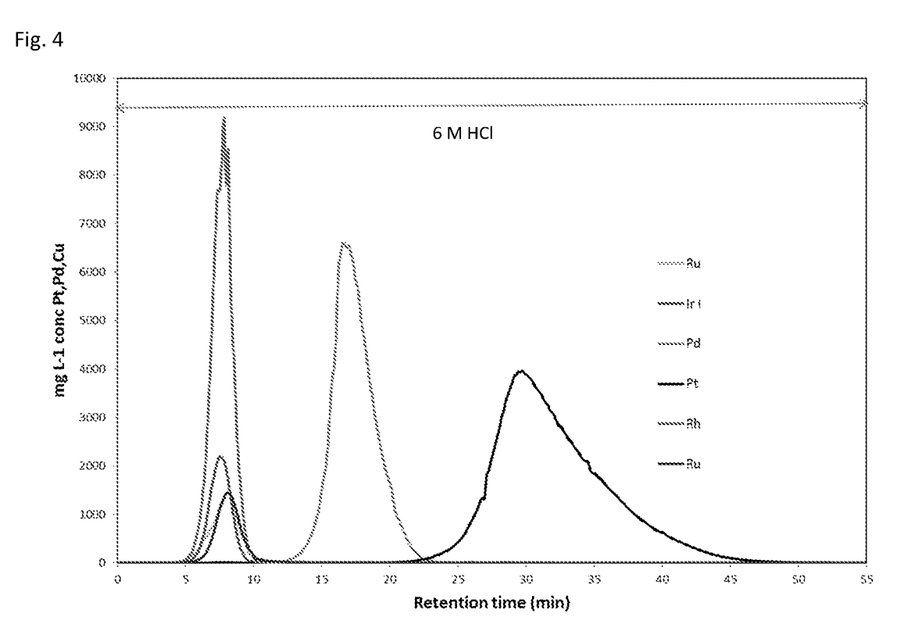
FIG. 4 shows a chromatogram for a separation method corresponding to that for FIG. 3 but with the HCl eluent maintained at 6 M for the whole elution cycle—the chromatogram exhibits a much longer Pt tail region without the step gradient resulting in a more dilute Pt band and a longer elution cycle time.

The same packed column with the axially compressed bed as described in example 1 was injected with 1 ml of the same feed at 2.3 mL min$^{-1}$. The eluent was maintained at 6 M for 55 minutes with no step change in concentration applied. The chromatogram (FIG. 4) exhibits a much longer Pt tail region without the step gradient resulting in more dilute Pt band and lower productivity per cycle.

Figure 5:
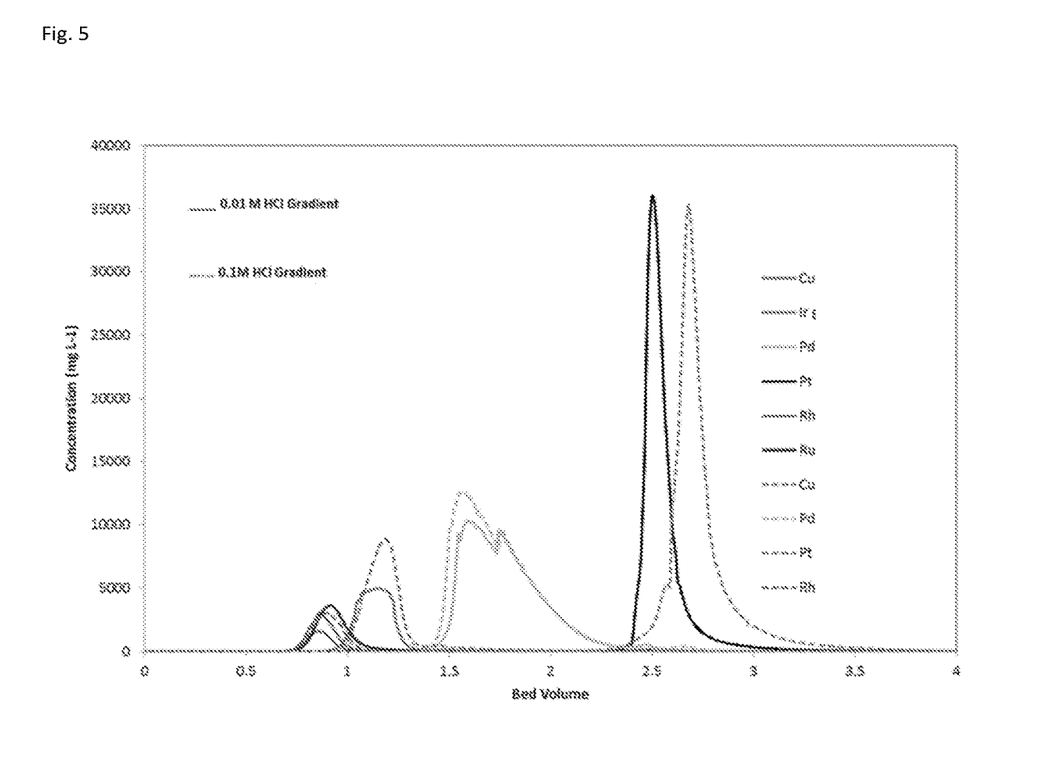
FIG. 5 shows a chromatogram illustrating separation of insoluble metals and Cu from Pd and Pt including: (i) a 6 M HCl elution phase and a 0.1 M HCl elution phase (dotted line); and (ii) a 6 M HCl elution phase and a 0.01 M HCl elution phase (solid line)—the 0.01 M chromatogram exhibits a more concentrated Pt band and a shorter elution cycle time compared to the 0.1 M chromatogram while still maintaining a clear separation between the Pd and Pt.

3. Gradient Elution of Insoluble Metal (IM), Pd, and Pt with a 0.01 M Step Acid Gradient In this experiment the concentration of the acid step gradient was reduced by an order of magnitude to 0.01 M[H+] with successful Pt elution and a better peak shape. This reduces cycle time and gives a more concentrated product Pt fraction. FIG. 5 shows a chromatogram illustrating separation of insoluble metals and Cu from Pd and Pt including: (i) a 6 M HCl elution phase and a 0.1 M HCl elution phase (dotted line); and (ii) a 6 M HCl elution phase and a 0.01 M HCl elution phase (solid line). The 0.01 M chromatogram exhibits a more concentrated Pt band and a shorter elution cycle time compared to the 0.1 M chromatogram while still maintaining a clear separation between the Pd and Pt.

4. Effect of Repeated Step Elution Cycles

Figure 6:
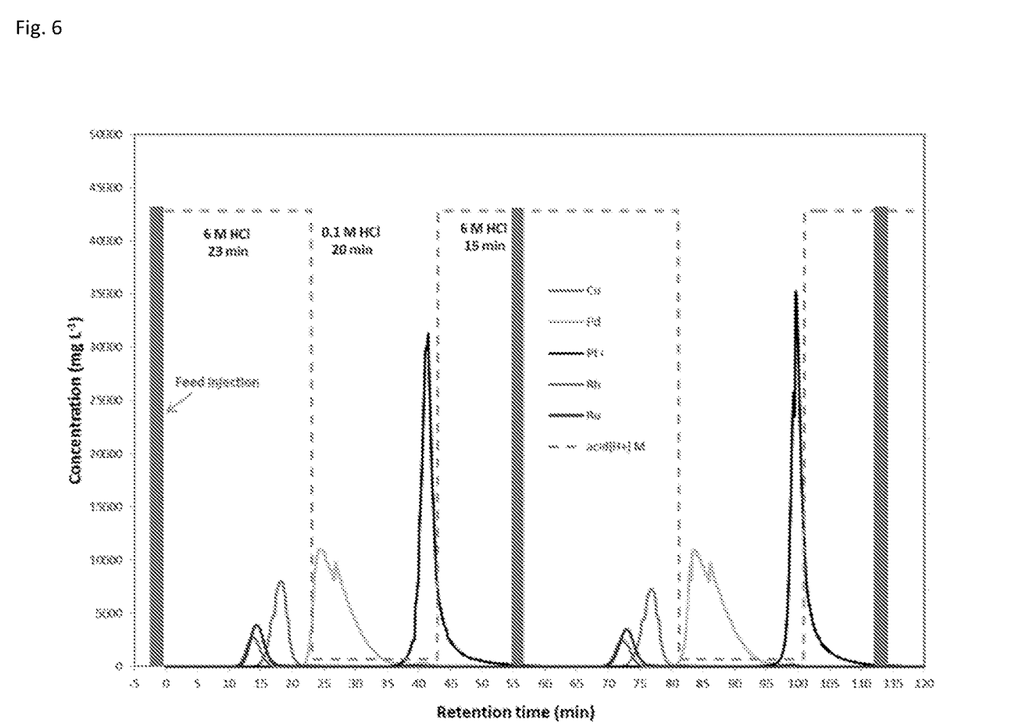
FIG. 6 shows a chromatogram in which injection of PGM feed is repeated automatically with an HCl eluent concentration gradient cycle from 6 M to 0.1 M repeating and allowing a column regeneration period to bring the column back to 6 M HCl before the next feed injection.

FIG. 6 shows a chromatogram in which injection of PGM feed is repeated automatically with an HCl eluent concentration gradient cycle from 6 M to 0.1 M repeating and allowing a column regeneration period to bring the column back to 6 M HCl before the next feed injection.

5. Gradient Elution of Pd Free Feed

Figure 7:
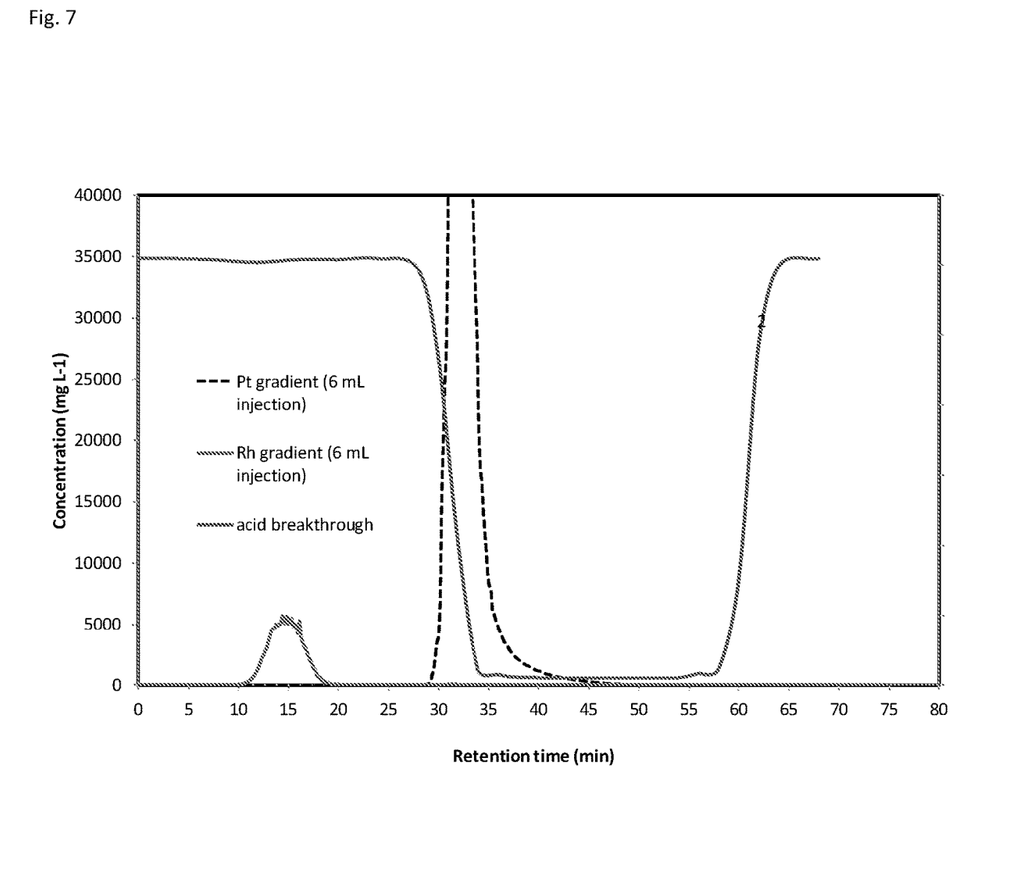
FIG. 7 shows a chromatogram illustrating the application of the gradient method to greatly improve the efficiency of the chromatographic Pt separation for feeds where Pd has previously been removed—the method gives significantly shorter cycle times and much better product concentration than a standard isocratic method.

FIG. 7 shows a chromatogram illustrating the application of the gradient method to greatly improve the efficiency of the chromatographic Pt separation for feeds where Pd has previously been removed. The method gives significantly shorter cycle times and much better product concentration than a standard isocratic method. In this example, a flow rate of 1.5 mL min$^{-1}$ was used for a feed containing Rh and Pt. A 6 M HCl elution phase was followed by a 0.1 M HCl elution phase before returning to 6 M HCl. The Rh eluted first between 10 and 20 minutes during the 6M HCl elution phase while the Pt eluted rapidly in a sharp, intense peak when the HCl eluent was reduced to 0.1 M.

6. Use of Different Chromatography Media

The previous examples can be repeated with a range of different chromatographic media including:
HW40F (variant with different media particle size);
HW65C (variant with different media pore size);
Macroprep Diol (variant with alternate methacrylate polymer);
Macroprep CM (variant with alternate carboxyl group chemistry);
ABEC 5000 (variant with alternate hydrophilic PS-DVB support); and
Methacrylate based thioether chromatography media.

7. RuNO Separation from the Other Insoluble Metals

A feed solution is prepared comprising Rh and Ir in the 3+ oxidation state and Ru in the form of RuNO via nitrosylation. Reduction in concentration of the eluent during elution is implemented to provide a more concentrated RuNO band when compared to an isocratic separation of the RuNO from the Rh and Ir. This provides an improved RuNO separation from the other insoluble metals.

8. Ir(IV) Separation from the Other Insoluble Metals and RuNO

A feed solution equivalent to the previous example is prepared and then oxidized to convert the Ir to the 4+ oxidation state. Reduction in concentration of the eluent during elution is implemented to accelerate Ir(IV) elution after elution of the RuNO. This provides an improved Ir(IV) separation from the other insoluble metals and RuNO.

9. Multiple Step Gradient Method for Separating PGMs and Gold

A feed solution is prepared comprising base metal, insoluble metals, palladium, platinum, and gold. The base metal and insoluble metals are eluted using 6 M HCl, the palladium and platinum are eluted with 1 M HCl, and the gold is eluted with 0.01 M HCl or water. This method provides an opportunity for a continuous process to separate PGM and gold/amphoteric metals.

10. Multiple Step Gradient Method for Separating PGMs Including Osmium and Gold

A feed solution is prepared comprising base metal, insoluble metals, palladium, platinum, osmium and gold. The base metal and insoluble metals are eluted using 6 M HCl, the palladium and platinum are eluted with 1 M HCl, and the osmium and gold are eluted with 0.01 M HCl or water. This method provides an opportunity for a continuous process to separate PGM and gold/amphoteric metals. This method provides an opportunity for enhanced osmium productivity.

11. Non-PGM Applications

While the preceding examples all involve separation of platinum group metals, it has been found that the gradient chromatography method of the present specification can also be usefully applied in methods of separating other transition metals in a feed solution. Examples include gradient chromatography methods for the separation of base metals such as nickel, cobalt, manganese, copper and iron, e.g. in battery materials recycling processes. Further still, the method may be applied to the chromatographic separation of other high value transition metals such as rhenium and technetium.

One example involves the separation of Ni and Co from Mn and Li. The feed is loaded into a chromatography column in strong acid (pH 1 down to 2 M $H_2SO_4$), the Li and Mn are washed off, cobalt is then stripped at pH 4 prior to moving back to stronger acid again to remove nickel efficiently. The method of forming a stable column configuration as described in this specification can be used to enable stable separation performance during this process.

Further still, certain examples relate to separation of transition metals in a chloride matrix. For example, elements associated with battery materials (e.g. Ni, Cu, Fe, Co) can be separated from a chloride matrix and gradient operation can be used to speed up such separation processes of transition metal chlorides in this way.

While this invention has been particularly shown and described with reference to certain examples, it will be understood to those skilled in the art that various changes in form and detail may be made without departing from the scope of the invention as defined by the appended claims.

The invention claimed is:

1. A method for separating at least two transition metals from each other, the method comprising:
    injecting a feed solution into a chromatography column comprising a chromatographic support media, the feed solution comprising at least two transition metals;
    eluting the feed from the column in an elution cycle by flowing an eluent through the column,
    wherein a concentration of the eluent is reduced during the elution cycle prior to elution of at least one of the transition metals, and
    wherein the eluent is HCl.

2. The method according to claim 1, wherein one or more of the transition metals are selected from the group consisting of platinum group metals, gold, nickel, cobalt, manganese, copper, iron, rhenium, and technetium.

3. The method according to claim 1, wherein the feed solution comprises at least two platinum group metals and at least one base metal and/or amphoteric element and/or gold, and the method comprises separating the at least two platinum group metals from each other and from at least one base metal and/or at least one amphoteric element and/or gold, wherein the concentration of the eluent is reduced during the elution cycle prior to elution of at least one of the platinum group metals.

4. The method according to claim 1,
    wherein the concentration of eluent is reduced from at least 5 M to no more than 1 M.

5. The method according to claim 1,
    wherein the concentration of the eluent is reduced as a step change from one concentration of eluent to a lower concentration of eluent.

6. The method according to claim 5,
    wherein the concentration of the eluent is further reduced by a second step change to a lower concentration of eluent during the elution cycle.

7. The method according to claim 1,
    wherein the concentration of the eluent is increased prior to the end of the elution cycle.

8. The method according to claim 1,
    wherein the feed comprises platinum and base metal, Rh in a 3+ oxidation state, Ir in a 3+ oxidation state, and Ru in a 3+ oxidation state, or any combination thereof, and
    wherein the concentration of the eluent is reduced after elution of the base metal, Rh, Ir, and/or Ru and prior to elution of the platinum from the column.

9. A method according to claim 8,
    wherein the feed further comprises palladium and the concentration of the eluent is reduced after elution of the base metal, Rh, Ir, and/or Ru and prior to or during the elution of the palladium.

10. A method according to claim 1,
    wherein the feed comprises Rh and Ir in a 3+ oxidation state, and RuNO, and
    wherein the concentration of the eluent is reduced after elution of the Rh and Ir, and prior to elution of the RuNO from the column.

11. A method according to claim 1,
    wherein the feed comprises base metal, Rh in a 3+ oxidation state, Ir in a 4+ oxidation state, and Ru in the form of RuNO, and
    wherein the concentration of the eluent is reduced prior to elution of the Ir from the column.

12. A method according to claim 1,
    wherein the feed comprises (i) base metal, (ii) Rh in a 3+ oxidation state, Ir in a 3+ oxidation state, Ru in a 3+ oxidation state, or any combination thereof, (iii) palladium, (iv) platinum, and (v) one or more of Fe, Te, Sn, Au, and Os, and
    wherein the concentration of the eluent is reduced after elution of the base metal, Rh, Ir, and Ru and prior to elution of the palladium and platinum, and
    wherein the concentration of eluent is further reduced after elution of the palladium and platinum and prior to elution of the Fe, Te, Sn, Au, and/or Os.

* * * * *